No. 790,360. PATENTED MAY 23, 1905.
C. T. GILMORE.
MANGLE.
APPLICATION FILED JUNE 8, 1904.
4 SHEETS—SHEET 1.
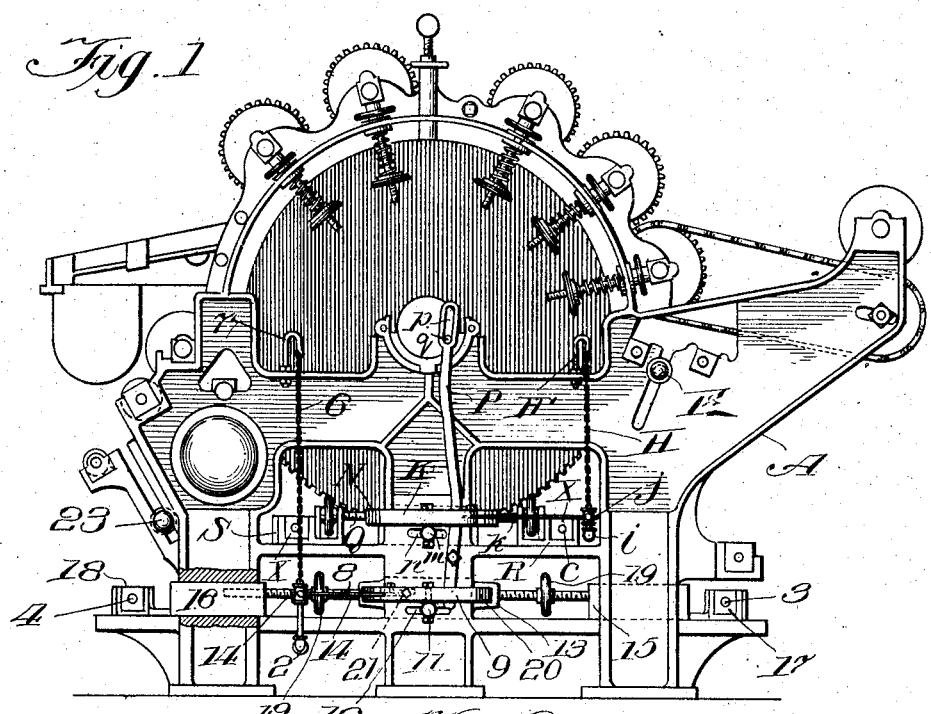
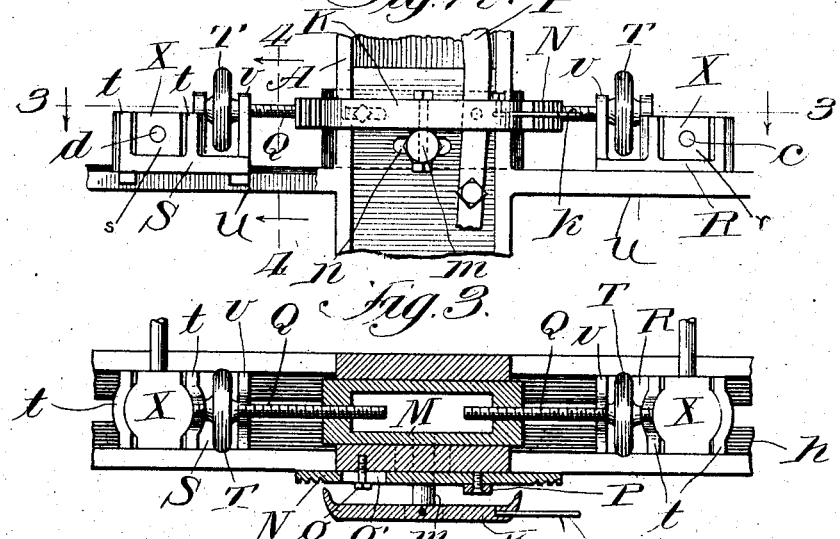
Witnesses:
Inventor:
Charles T. Gilmore
by Frank D. Thomason
Attorney No. 790,360. PATENTED MAY 23, 1905.
C. T. GILMORE.
MANGLE.
APPLICATION FILED JUNE 8, 1904.
4 SHEETS—SHEET 2.
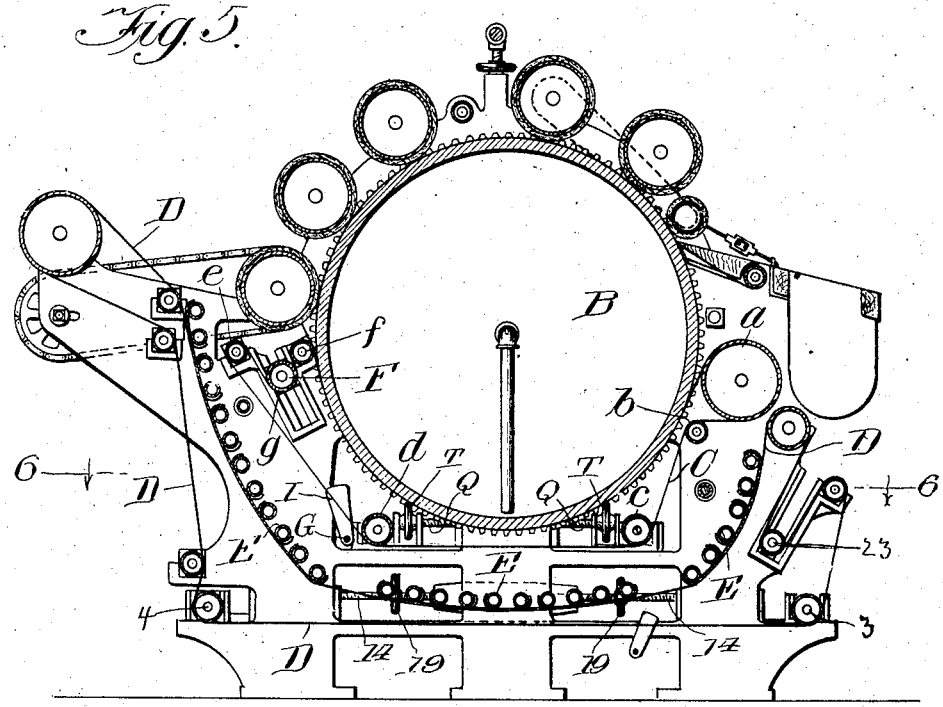
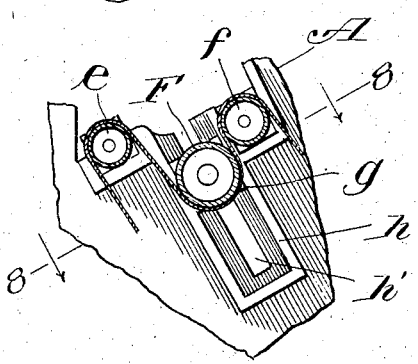
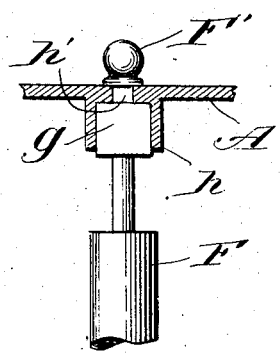
Witnesses:
Inventor:
Charles T. Gilmore
By Frank D. Thomason
Attorney

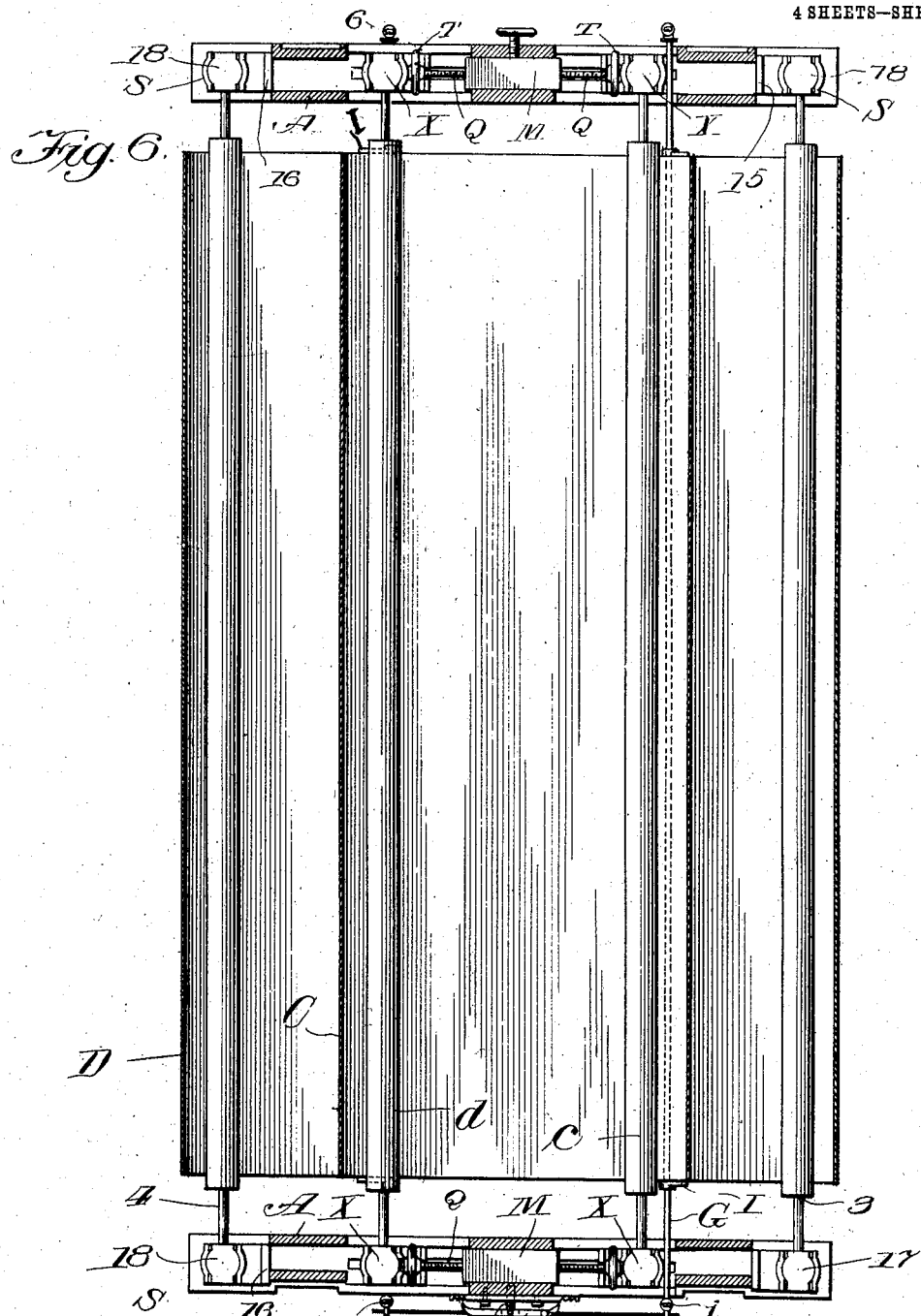

No. 790,360. PATENTED MAY 23, 1905.
C. T. GILMORE.
MANGLE.
APPLICATION FILED JUNE 8, 1904.
4 SHEETS—SHEET 4.
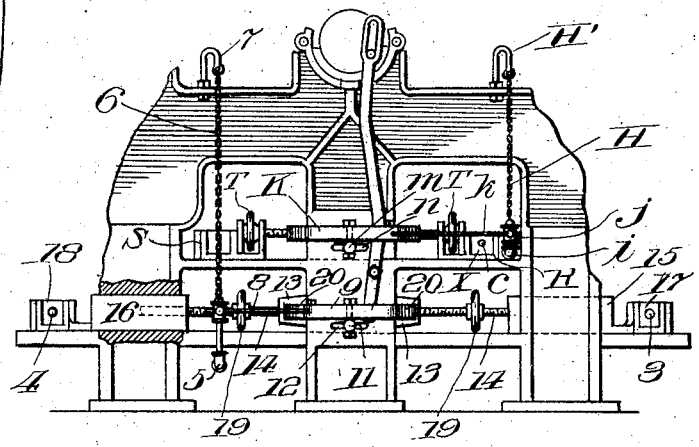
Fig. 11.
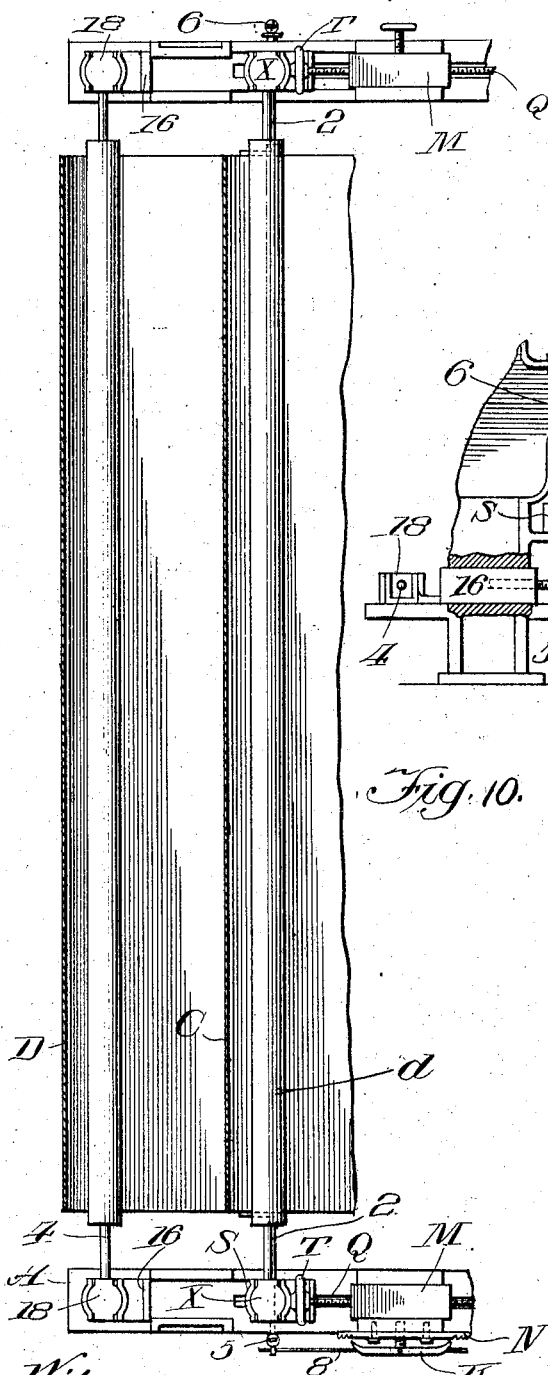
Fig. 10.
Fig. 12.
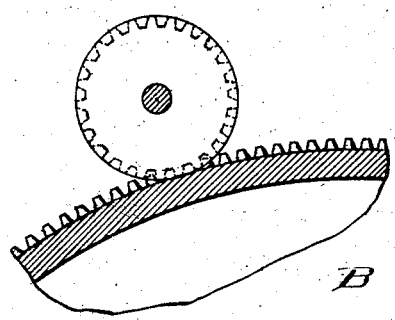
Witnesses:
O. M. Weinich
E. R. Lundy
Inventor:
Charles T. Gilmore
By Frank A. Thomason
Atty No. 790,360.

Patented May 23, 1905.

UNITED STATES PATENT OFFICE.

CHARLES T. GILMORE, OF SAULT STE. MARIE, MICHIGAN.

MANGLE.

SPECIFICATION forming part of Letters Patent No. 790,360, dated May 23, 1905.

Application filed June 8, 1904. Serial No. 211,632.

*To all whom it may concern:*

Be it known that I, CHARLES T. GILMORE, a citizen of the United States, and a resident of Sault Ste. Marie, in the county of Chippewa and State of Michigan, have invented certain new and useful Improvements in Mangles, of which the following is a full, clear, and exact description, reference being had to the accompanying drawings.

My invention relates to mangles, and has for its object the automatic guiding of the apron as it courses through the machine, so that side movement or twist thereof is avoided. This I accomplish by the means hereinafter fully described and as particularly pointed out in the claims.

In the drawings, Figure 1 is a side elevation of a mangle having my improvements applied thereto. Fig. 2 is a side view, on a larger scale, of the principal part of the automatic regulating devices of my invention and broken-away portions of the side frame of the machine supporting the same. Fig. 3 is a horizontal section taken on dotted line 3 3, Fig. 2, looking in the direction indicated by the arrows. Fig. 4 is a vertical section taken on dotted line 4 4, Fig. 2, looking in the direction indicated by the arrows. Fig. 5 is a longitudinal vertical section of said improved mangle. Fig. 6 is a horizontal section of the machine with the drum and portions of the side frames of the same omitted, taken on the plane of dotted line 6 6, Fig. 5, looking downward. Figs. 7 and 8 are detail views illustrating by a vertical section and a horizontally-disposed section the bearings of the apron-tightening roller. Fig. 9 is a detail view of one end of the apron-guide. Fig. 10 is a top plan view, on an enlarged scale, of the left-hand portion of the mangle as shown in Fig. 6. Fig. 11 is a detail view of a portion of the side of my invention. Fig. 12 is an enlarged sectional view of the steam-drum used in connection with my invention, showing one of the rollers coöperating therewith.

Having reference to the drawings, A represents the side frames of the mangle; B, the large steam-heated drum thereof, suitably journaled in said side frames; C, the apron engaging substantially the lower half of the circumference of said drum, and D the lower apron which receives the work from apron C and conveys the same to the drying and polishing coils E, arranged, as shown in the drawings, below and practically conterminous and parallel with apron C. As my invention principally concerns means for automatically guiding the aprons so that they travel at right angles to the axis of drum B, it is immaterial how or in what manner said drum or the drying and polishing coils are constructed, nor how the drum is engaged by a series of cylinders, nor how or in what manner the work is fed to and delivered from the machine.

Apron C after it leaves the drum passes around a comparatively large cylinder $a$ and moves out of engagement with the latter at about its lower segment and in an almost horizontal plane and then passes over a guide-roller $b$, suitably journaled in fixed bearings in the side frames. From guide-roller $b$ the apron C travels downward to and under a roller $c$ and then in a horizontal plane under the center of the drum to and under a corresponding roller $d$, located the same distance from the vertical plane intersecting and alining with the axis of the drum on one side as roller $c$ is on the other. These rollers $c$ and $d$ are journaled in bearings that are adjustable to and from the said vertical plane intersecting the axis of the drum, so as to give the proper direction to the apron at the time the mangle is made ready for use. At one end the bearings of these rollers remain stationary in their adjusted positions while the mangle is in operation. The bearings at the opposite end, however, are automatically moved toward or away from the said vertical plane intersecting the axis of the drum, so that their axes are slightly oblique to the line of travel of the apron to correct any tendency of the said apron to creep sidewise in either direction.

From roller $d$ apron C travels in an upwardly-inclined direction to over a guide-roller $e$, that has fixed bearings in the side frames, and then extends back under a gravity-roller F and then up, over, and around the guide-roller $f$ back into engagement with the drum B. The roller F has bearings in suitable bearing-blocks $g$ $g$, that are movable in vertically-disposed guideways $h$ in the side frames and have their ends extend through their bearings and through longitudinal slots $h'$ in said guideways $h$ and provided with suitable heads F' on their extremities to prevent longitudinal movement. The weight of this roller F is borne on apron C between rollers $e$ and $f$ and takes up the slack of said apron. Obviously in order that the apron may promptly respond in the manner hereinbefore indicated to the action of the controlling-rollers $c$ and $d$ it is desirable that the apron be kept tight. Roller F is designed for this purpose, although it can be dispensed with.

The means for controlling the obliquity of rollers $c$ and $d$ comprise a transverse rod G, which near roller $d$ passes under apron C and has its ends extending out of suitable openings in side frames A and provided with suitable elbows $i$, the upturned ends of which are connected by nipples to short sections of pipe $j$, which are attached to the lower end of a chain H, suspended from the goosenecks H', secured to the upper edge of the side frame, substantially as shown in the drawings. This rod G has blades I secured thereto in suitable manner, which project up on either side of the apron C, so that any sidewise movement of the latter moves the rod longitudinally to a corresponding extent. Inserted through and adjustable longitudinally in a suitable opening in the pipe $j$ at right angles to the length of rod G is a horizontal arm $k$, which extends parallel to the vertical plane of the adjacent side frame and has its opposite end rigidly secured in the adjacent end of a rocking pawl K. This pawl K is arranged horizontally and is fulcrumed at its center of length to the outer end of a stud $m$, which projects laterally from a longitudinally-movable horizontal head M of rectangular proportions out through a horizontal slot $n$ in the side frame, whose center of length is intersected by the vertical plane intersecting and alining with the axis of the drum.

The ends of the pawls K are tapered and turned in toward the side frame and are adapted to engage a horizontal reciprocating rack N, which is held in position against the adjacent side frame, so that it can slide back and forth, by a screw $o$, which is tapped into the side frame and extends out through a longitudinally-elongated slot $o'$ in the rack N near one end thereof, and near its opposite end by its pivotal connection to a vertical lever P at a point above the fulcrum of the latter. The pitch of the teeth at the opposite ends of the rack are opposed to each other, and when the pawl is rocked by reason of rod G being moved longitudinally when the apron creeps sidewise it engages the rack, which latter as it reciprocates moves the pawl longitudinally and likewise the head M to the stud projecting from which it is pivoted. The lever P extends up above the point of its pivotal connection with rack N until opposite the end of the adjacent journal of the drum, where it is provided with a longitudinally-elongated slot $p$, out through which an eccentric $q$, extending from the extremity of said journal, projects. As the drum revolves lever P is rocked back and forth and imparts its motion to the rack N, as stated.

The head M is seated and moves in a suitable passage in the central vertical column of the side frame, and it is connected at its ends by a longitudinally-extending threaded bar Q to the carrier R of the bearing-block $r$ of the roller $c$ opposite and in alinement with one end and to the corresponding carrier S of the bearing-block $s$ of the roller $d$ opposite the other end of the same. These carriers each comprise a bed-plate from the portion of which farthest from the head M arise transverse walls $t$ $t$, between which the bearing-blocks of said rollers are placed. The sides of these bearing-blocks are convexed and conform to segments of a circle struck from the center of the same, and the surfaces of the walls $t$ engaged thereby are concaved to accommodate the convexity of the said bearing-blocks, and thereby permit the necessary rotative movements of the same to allow the obliquity of rollers $c$ and $d$. The threaded bars Q are rotatively secured in suitable bearings in the wall $t$ of the carriers nearest head M, and the adjacent upturned ends $v$ of said carriers and between said walls and said upturned ends are provided with hand-wheels T, by means of which said bars are revolved and the carriers adjusted longitudinally in any position within the limits of said bars to or from head M, as desired. These carriers move in channels made in suitable horizontal rails U, connecting the central column with the legs of said side frames, substantially as shown.

The mechanism for automatically guiding the apron D, engaging the drying and polishing coils, is the same as that hereinbefore described in relation to apron C, excepting that the proportions of the same are different. A transverse rod 2 passes under the lower horizontal stretch of the apron between the controlling-rollers 3 and 4, preferably on the side of the vertical plane of the axis of the drum opposite rod G. The ends of this rod 2 are likewise provided with elbows 5, and these elbows are attached to the lower ends of chains 6, suspended from the goosenecks 7. The elbow at one end of this rod 2 is connected by an arm 8, removably secured in the adjacent end of a horizontal pawl 9, which is pivoted at its center of length to the outer end of a stud 11, projecting out through a horizontally-elongated slot 12 in the center column of the side frame from the head 13. This head 13 is reciprocal horizontally in a suitable passage in said central column of the side frame parallel to the sides of the latter and is connected by screw-threaded bars 14 to the carriers 15 and 16 of the bearing-blocks 17 and 18, respectively, of the rollers 3 and 4, which bearing-blocks and carriers are constructed substantially the same as bearing-blocks *s* and carriers S, hereinbefore described, and are adjusted to and from head 13 by a hand-wheel 19 in the same manner thereas.

Pawl 9 has its ends turned toward the side frame and are adapted to engage a horizontally-reciprocal rack 20, having opposing teeth on its end and held against said side frame by a bolt 21 and reciprocated back and forth opposite the pawl as the drum revolves by the lever P, to which said rack is pivotally connected at a suitable point below the fulcrum thereof. The rod 2 has blades 22 secured thereto, which project up on either side of and are engaged by the edges of apron D, and any sidewise movement of the said apron causes the bearings of rollers 3 and 4 to move and brings said rollers into the necessary oblique position necessary to stop such movement and restore the apron to its proper path.

If desired, an apron-tightening roller 23 can be used in conjunction with apron D, substantially as shown in the drawings. In this event said roller would be constructed and arranged and would operate substantially the same as roller F.

What I claim as new, and desire to secure by Letters Patent of the United States, is—

1. In a mangle the combination with a revolving drum, an endless apron engaging the same, and a roller therefor movable bodily oblique to the line of travel of said apron, of a transverse rod engaged by said apron when it creeps sidewise, and means actuated by said drum for imparting the endwise motion of said rod to said roller.

2. In a mangle the combination with a revolving drum, an endless apron engaging the same, and a roller therefor movable bodily oblique to the line of travel of said apron, of a suspended transverse rod engaged by said apron when it creeps sidewise, and means actuated by said drum for imparting the endwise motion of said rod to said roller.

3. In a mangle the combination with a revolving drum, an endless apron engaging the same, two rollers therefor simultaneously movable bodily oblique to the line of travel of said apron according to the sidewise creep of the same, and disconnected and independently-movable bearings therefor.

4. In a mangle the combination with a revolving drum, an endless apron engaging the same, and two rollers therefor simultaneously movable bodily oblique to the line of travel of said apron, of a transverse rod engaged by said apron when it creeps sidewise, and means actuated by said drum for imparting the endwise motion of said rod to said roller.

5. A mangle comprising a revolving drum, an endless apron engaging the same, a roller therefor movable bodily oblique to the line of travel of said apron, and means actuated by said drum for transforming any sidewise movement of the apron into oblique movement of the roller.

6. A mangle comprising a revolving drum, an endless apron engaging the same, two rollers therefor simultaneously movable bodily oblique to the line of travel of said apron, and common means actuated by said drum for transforming any sidewise movement of the apron into oblique movement of the roller.

7. In a mangle the combination with a revolving drum, an endless apron engaging the same, rollers therefor the bearings at one end of which are movable in a plane at right angles to the line of travel of said apron, and a vertically-disposed vibrating lever actuated by said drum, of a horizontally-reciprocating rack pivotally connected to said lever, a rocking pawl adapted to engage said rack and operatively connected to said bearings, and means actuated by said apron for causing said pawl to engage said rack.

8. In a mangle the combination with a revolving drum, an endless apron engaging the same, rollers therefor the bearings at one end of which are movable in a plane at right angles to the line of travel of said apron, and a vertically-disposed vibrating lever actuated by said drum, of a horizontally-reciprocal rack pivotally connected to said lever, a rocking pawl adapted to engage said rack, a reciprocal head to which said pawl is pivotally secured and to which said bearings are connected, and means actuated by said apron for causing said pawl to engage said rack.

9. In a mangle the combination with a revolving drum, an endless apron engaging the same, rollers therefor the bearings at one end of which are movable in a plane at right angles to the line of travel of said apron, and a vertically-disposed vibrating lever actuated by said drum, of a horizontally-reciprocal rack pivotally connected to said lever, a rocking pawl adapted to engage said rack, a reciprocal head to which said pawl is pivotally secured and to which said bearings are adjustably connected, and means actuated by said apron for causing said pawl to engage said rack.

10. In a mangle the combination with a revolving drum, an endless apron engaging the same, rollers therefor the bearings at one end of which are movable in a plane at right angles to the line of travel of said apron, and a vertically-disposed vibrating lever actuated by said drum, of a horizontally-reciprocal rack pivotally connected to said lever, a rocking pawl adapted to engage said rack and operatively connected to said bearings, a transverse rod arranged crosswise said apron and movable longitudinally according to the sidewise creep of the apron, and means connecting the same to the pawl.

11. In a mangle the combination with a revolving drum, an endless apron engaging the same, rollers therefor the bearings at one end of which are movable in a plane at right angles to the line of travel of said apron, and a vertically-disposed vibrating lever actuated by said drum, of a horizontally-reciprocal rack pivotally connected to said lever, a rocking pawl adapted to engage said rack and operatively connected to said bearings, a suspended transverse rod arranged crosswise said apron and movable longitudinally according to the sidewise creep of the apron, and an arm arranged at right angles thereto connecting the same to the pawl.

12. In a mangle the combination with a revolving drum, an endless apron engaging the same, rollers therefor the bearings at one end of which are movable in a plane at right angles to the line of travel of said apron, and a vertically-disposed vibrating lever actuated by said drum, of a horizontally-reciprocal rack pivotally connected to said lever, a rocking pawl adapted to engage said rack, a reciprocal head to which said pawl is pivotally secured and to which said bearings are connected, a transverse rod arranged crosswise said apron and movable longitudinally according to the sidewise creep of the apron, and means connecting the same to the pawl.

13. In a mangle the combination with a revolving drum, an endless apron engaging the same, rollers therefor the bearings at one end of which are movable in a plane at right angles to the line of travel of said apron, and a vertically-disposed vibrating lever actuated by said drum, of a horizontally-reciprocal rack pivotally connected to said lever, a rocking pawl adapted to engage said rack, a reciprocal head to which said pawl is pivotally secured and to which said bearings are connected, a suspended transverse rod arranged crosswise said apron and movable longitudinally according to the sidewise creep of the apron, and an arm arranged at right angles thereto connecting the same to the pawl.

14. In a mangle the combination with a revolving drum, an endless apron engaging the same, a gravity-roller for tightening said apron, rollers therefor the bearings at one end of which are movable in a plane at right angles to the line of travel of said apron, and a vertically-disposed vibrating lever actuated by said drum, of a horizontally-reciprocal rack pivotally connected to said lever, a rocking pawl adapted to engage said rack and operatively connected to said bearings, and means actuated by said apron for causing said pawl to engage said rack.

15. In a mangle the combination with a revolving drum, an endless apron engaging the same, a gravity-roller for tightening said apron, rollers therefor the bearings at one end of which are movable in a plane at right angles to the line of travel of said apron, and a vertically-disposed vibrating lever actuated by said drum, and a horizontally-reciprocal rack pivotally connected to said lever, a rocking pawl adapted to engage said rack, a reciprocal head to which said pawl is pivotally secured and to which said bearings are connected, and means actuated by said apron for causing said pawl to engage said rack.

16. In a mangle the combination with a revolving drum, an endless apron engaging the same, a gravity-roller for tightening said apron, rollers therefor the bearings at one end of which are movable in a plane at right angles to the line of travel of said apron, and a vertically-disposed vibrating lever actuated by said drum, of a horizontally-reciprocal rack pivotally connected to said lever, a rocking pawl adapted to engage said rack, a reciprocal head to which said pawl is pivotally secured and to which said bearings are adjustably connected, and means actuated by said apron for causing said pawl to engage said rack.

17. In a mangle the combination with a revolving drum, an endless apron engaging the same, a gravity-roller for tightening said apron, rollers therefor the bearings at one end of which are movable in a plane at right angles to the line of travel of said apron, and a vertically-disposed vibrating lever actuated by said drum, of a horizontally-reciprocal rack pivotally connected to said lever, a rocking pawl adapted to engage said rack and operatively connected to said bearings, and a transverse rod arranged crosswise said apron and movable longitudinally according to the sidewise creep of the apron, and means connecting the same to the pawl.

18. In a mangle the combination with a revolving drum, an endless apron engaging the same, a gravity-roller for tightening said apron, rollers therefor the bearings at one end of which are movable in a plane at right angles to the line of travel of said apron, and a vertically-disposed vibrating lever actuated by said drum, of a horizontally-reciprocal rack pivotally connected to said lever, a rocking pawl adapted to engage said rack, and operatively connected to said bearings, a suspended transverse rod arranged crosswise said apron and movable longitudinally according to the sidewise creep of the apron, and an arm arranged at right angles thereto connecting the same to the pawl.

19. In a mangle the combination with a revolving drum, an endless apron engaging the same, a gravity-roller for tightening said apron, rollers therefor the bearings at one end of which are movable in a plane at right angles to the line of travel of said apron, and a vertically-disposed vibrating lever actuated by said drum, of a horizontally-reciprocal rack pivotally connected to said lever, a rocking pawl adapted to engage said rack, a reciprocal head to which said pawl is pivotally secured and to which said bearings are connected, a transverse rod arranged crosswise said apron and movable longitudinally according to the sidewise creep of the apron, and means connecting the same to the pawl.

20. In a mangle the combination with a revolving drum, an endless apron engaging the same, a gravity-roller for tightening said apron, rollers therefor the bearings at one end of which are movable in a plane at right angles to the line of travel of said apron, and a vertically-disposed vibrating lever actuated by said drum, of a horizontally-reciprocating rack pivotally connected to said lever, a rocking pawl adapted to engage said rack, a reciprocal head to which said pawl is pivotally secured and to which said bearings are connected, a suspended transverse rod arranged crosswise upon said apron and movable longitudinally according to the sidewise creep of the apron, and an arm arranged at right angles thereto connecting the same to the pawl.

21. A mangle comprising a revolving drum, an endless apron engaging the same, a roller therefor movable bodily oblique to the line of travel of said apron, drying and polishing devices, an endless apron engaging the same, a roller therefor movable oblique to the line of travel of said last-mentioned apron, and independent means both actuated by said drum for transforming the endwise movement of either of said aprons into oblique movement of the said roller engaging the same.

In testimony whereof I have hereunto set my hand this 3d day of June, 1904.

CHARLES T. GILMORE.

Witnesses:
O. M. WERMICH,
E. K. LUNDY.